Sept. 18, 1951  A. E. LE VAN  2,568,238
FLUID SEPARATING DIAPHRAGM IN FITTING FOR PRESSURE GAUGES
Filed Feb. 27, 1946  2 Sheets-Sheet 1

AMBROSE E. LE VAN INVENTOR.

BY

Sept. 18, 1951  A. E. LE VAN  2,568,238
FLUID SEPARATING DIAPHRAGM IN FITTING FOR PRESSURE GAUGES
Filed Feb. 27, 1946  2 Sheets-Sheet 2

AMBROSE E. LE VAN  INVENTOR.

BY

Bruno C. Lechler

Patented Sept. 18, 1951

2,568,238

UNITED STATES PATENT OFFICE 2,568,238

FLUID SEPARATING DIAPHRAGM IN FITTING FOR PRESSURE GAUGES

Ambrose E. Le Van, Sellersville, Pa., assignor to American Machine and Metals, Inc., New York, N. Y., a corporation of Delaware Application February 27, 1946, Serial No. 650,434

3 Claims. (Cl. 73—395)

This invention relates to fluid pressure-indicating instruments and more particularly to pressure gauges for measuring the pressure of fluids which, if used in ordinary type gauges, would be injurious to the reliable operation of the working parts of the instrument. The fluid may, for instance, be a gas or liquid that is corrosive to the parts of the gauge or it may be one which deposits scale, sediment, or other accretions that are liable to obstruct the passages of the gauge or to affect the proper functioning of the gauge mechanism.

It is an object of this invention to provide a fluid pressure-indicating instrument particularly suited for use with such "injurious" fluids, the indicating instrument proper being of the Bourdon tube type and the whole instrument being of small dimensions.

It is a further object of the invention to provide a fluid pressure-indicating instrument embodying a Bourdon tube, that is fluid-tightly separated from the "injurious" fluid by means of a metal diaphragm, the gauge and diaphragm forming part of a removable structural unit.

A further object of the invention is to provide a fluid pressure-indicating instrument of the kind mentioned, wherein a metal diaphragm forms one wall of a pressure chamber or cell communicating with the Bourdon tube, the cell being filled with a liquid that will not injure the material of the Bourdon tube or prevent its proper operation, the instrument being constructed to permit ready disassembly and reassembly with a subbase to permit cleaning the face of the metal diaphragm which is exposed to the fluid whose pressure is to be measured.

It is a further object of the invention to provide a fluid pressure-indicating instrument of the type described wherein a slight movement of the metal diaphragm is sufficient to operate the Bourdon tube over its full range.

Another object of the invention is to construct the fluid pressure-indicating instrument of the type described in such a manner that the metal diaphragm may be made of homogeneous sheets of corrosion-resisting materials, in particular precious metals, rather than of sheets plated.

A further object of the invention is to provide a fluid pressure-indicating instrument wherein the aforementioned structural unit embodying the Bourdon tube and the metal diaphragm may be removably clamped against a rim surrounding a chamber filled with the fluid whose pressure is to be measured in a manner to clamp that rim against the diaphragm.

It is another object of the invention to provide a fluid pressure-indicating instrument of the kind mentioned wherein the edge of the metal diaphragm is soldered to a seat formed on the removable structural unit, and is also forcibly held on that seat independently of the soldering by clamping means when the instrument is assembled.

Another object of the invention is to secure a tight seal all around the edge of the metal diaphragm and the rim surrounding the chamber filled with the fluid whose pressure is to be measured without high accuracy in making the parts.

A further object of the invention is to provide for a coupling member located between the structural assembly to which the metal diaphragm is soldered and the part to be removably clamped against this diaphragm, said coupling member aligning said two parts in the act of clamping so that a tight seal between said edge of the diaphragm and said clamping means will be established all around the circumference in spite of inaccuracies in the machining of the parts to be coupled.

A still further object of the invention is to provide in an instrument of the type mentioned a sleeve adapted to aid the clamping of the metal diaphragm between the two parts which are capable of being disassembled for cleaning, said sleeve affording an anchorage for a clamping ring which holds the two parts together in a manner to assure that a bearing around the entire circumference is attained.

Other objects and advantages will appear as the description proceeds, reference being had to the accompanying drawings which, by way of example, illustrate one embodiment of the invention and in which.

Figure 1:
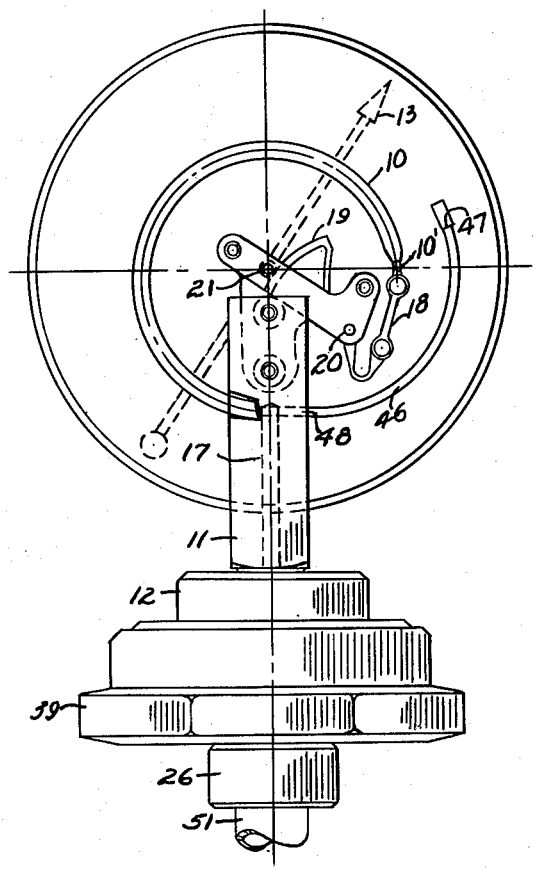
Fig. 1 shows in elevation one form of the invention, the cover of the Bourdon tube housing being removed.

10 denotes a Bourdon tube supported on a post 11. This post is screwed into a base 12, here shown as being generally shaped like an inverted cup. An inner pressure chamber or cell 15 is formed within this base by a diaphragm 14 whose edge portion is soldered to a seat 16 on the inside of the cup-shaped base 12. The inside of the Bourdon tube 10 communicates with a bore 17 extending down through the post 11 to the pressure cell 15. A tube 46, also supported by the post, connects through a passage 48 with bore 17. The end of tube 46 is closed at 47. This tube is provided to permit any air in the Bourdon tube gauge, the passages in the post 11, or the pressure cell 15 to be exhausted and replaced by a solid body of an inert pressure-transmitting liquid free from air bubbles. When these passages have all been filled with liquid the end of tube 46 is disconnected from the vacuum pump and sealed at 47.

This construction which assures no gas is present in the system permits the use of a diaphragm 14 of small diameter because the slightest displacement of the diaphragm is sufficient to force enough inert liquid through the bore 17 to supply the slightly increased volume held within the Bourdon tube gauge when under pressure.

"Inert liquid" is here used to designate any liquid which is not compressible, does not attack the parts of the gauge, and remains fluid within the temperature range generally experienced in the use of such gauges. For many applications oil is sufficiently inert.

The post 11 also supports the pressure-indicating mechanism. As the Bourdon tube 10 expands, the movable end of the tube, 10′, moves a link 18 which is connected to an arm forming part of a toothed segment 19. This toothed segment is free to turn about a pivot 20 and engages in a well-known manner which needs no illustration, a pinion mounted on the shaft 21. This shaft 21 carries a pointer, 13.

Figure 3:
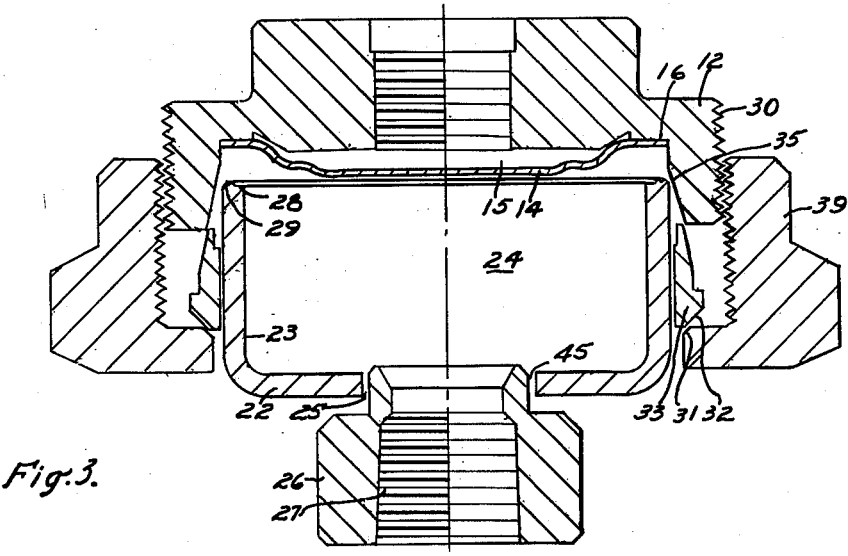
Fig. 3 shows the same parts as Fig. 2 in vertical section, but disassembled for cleaning.

The parts just described form a structural unit which can readily be assembled or disassembled with its support shown in Fig. 3.

Figure 2:
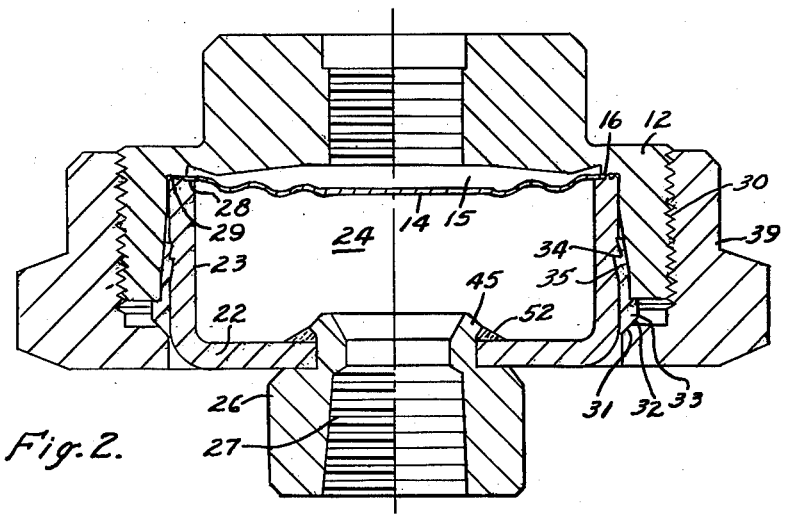
Fig. 2 shows a vertical section on a larger scale through a portion of the apparatus shown in Fig. 1, the parts being shown assembled for use.

Screwed to the top of pipe 51, which contains a fluid whose pressure is to be measured, is a nipple 26 internally threaded at 27. The flange 45 forming the upper portion of the nipple is inserted in opening 25 at the bottom of container 22. This flange may be spun over and welded to the container as shown at 52. When the structural unit described is placed upon this cup as shown in Fig. 2, a second or outer pressure chamber 24 is formed. The fluid whose pressure is to be measured fills the outer chamber 24, pressing against the outer face of diaphram 14. It thus transmits its own pressure to the inert liquid on the other side of the diaphragm. If the liquid in chamber 24 be corrosive, or should it deposit a sediment, or congeal, only the outer face of the diaphragm 14 and the inside of the container 22 are affected. When the structural unit is disassembled in the manner shown in Fig. 3 this outer surface of the diaphragm may readily be cleaned without in any way affecting the adjustments of the pressure-measuring unit.

Figure 4:
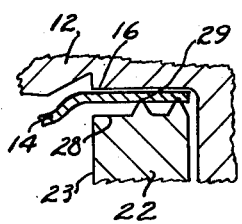
Fig. 4 is a fragmentary vertical section showing on a still larger scale the clamping of the diaphragm shown in Fig. 2.

To assure a seal between the upper edge of the cylindrical wall 23 of container 22 and the diaphragm 14 the parts are so dimensioned that in their assembled position, Fig. 2, the rim 28 of the container 22 clamps the diaphragm 14 between itself and the seat, 16, on the base 12 of the movable structural unit. Thus it will appear that every time the gauge is reassembled with its sub-base, the inner pressure cell 15 and outer cell 24 are assured of a tight seal independent of the soldering that holds the diaphragm to its seat during cleaning. To secure a fluid-tight joint around the entire rim when clamping the rim 28 is equipped with ridges 29 as shown more particularly in Fig. 4 that concentrate the pressure upon narrow rims extending around the chamber 24.

To secure the necessary pressure to hold these parts rigidly together during assembly the base 12 has an externally threaded flange 30. The parts are drawn together by a special nut 39 which engages this threaded flange. This nut does not directly engage the container 22 but a beveled surface 31 of the nut bears against a conical surface 32 of a sleeve 33. This sleeve consists of a harder material than cup 22 and is cylindrical before assembly (Fig. 3). The sleeve fits loosely upon the cylindrical wall 23 and has a cutting edge 34 which is adapted, when forced inward, to bite into the wall 23, forming its own seat against which the nut 39 may react in drawing the base 12 tightly against the ridges 29 on rim 28 of container wall 23. To distort the sleeve 33 in the manner described, the inner surface of the flange 30 on the base is tapered at 35. As the nut 39 is screwed upward on the threaded flange 30 of base 12, the sleeve 33 is pushed upwards over the outside of the container 22 until it engages the tapered inner wall of flange 30 on the base. This forces the cutting edge 34 into the wall of the cup in the manner described. As the parts are tightened more the cutting edge will bite deeper into the wall 23. In so doing the clamping device forms its own seat, being able to move more or less at different points of the circumference responsive to the pressure between the ridges 29 and the diaphragm until a substantially even bearing is attained around the entire circumference. This permits machining the parts described with ordinary tolerances and still attain a perfect seal around the rim 28 for the pressure cell 24 and also for the pressure cell 15 without the necessity of having the various elements of the construction all truly coaxial and in planes normal to the axis.

Such a tight seal all around the circumference is of particular importance where the fluid whose pressure is to be measured is of a poisonous or explosive character. Obviously, the desired seal around the entire circumference could be obtained by very precise machining and/or exact aligning of the parts, but the sleeve 33 will assure attaining the same result without such expensive and tedious means.

Merely by unscrewing the nut 39, the base 12 may be disconnected from the container 22 and the whole unit shown in Fig. 3 may be taken off, such as for the purpose of cleaning the exposed surface of the diaphragm 14.

To expand the Bourdon tube 10 from no-pressure indication to full-pressure indication, only a very small amount of liquid need be forced additionally into the Bourdon tube. In the case of the present invention it is the movement of the diaphragm 14 which forces into, or releases from, the Bourdon tube said additional amount of liquid and this amount being small, the movement of the diaphragm even for achieving the maximum movement of the end 10′ of the Bourdon tube need likewise only be slight. For that reason a diaphragm of small area may be used and this, in turn, permits small dimensions of the instrument as a whole.

It will be noted that the column of liquid resting upon the upper side of the diaphragm 14 partakes as a whole in the movements of the diaphragm 14 and that this diaphragm is moved by the fluid in the chamber 24 acting upon the lower side of the diaphragm. Therefore the diaphragm has practically no other function than that of a flexible separating wall. In particular, the flexure characteristics of the material of which the diaphragm is made are of no importance. This is in contrast to those known uses of diaphragms in the pressure-indicating instruments where the movements of the diaphragm are translated entirely mechanically into movement of a pointer or the like. In these latter cases diaphragms of rather large diameters had to be used and the materials of which these diaphragms were made had to have good spring characteristics, such as found in steel or Phosphor bronze. Since the materials are not sufficiently chemically resistive to many of the fluids for which these instruments were designed, it has been customary to protect these materials by a thin layer of precious metal, e. g., silver. To make the whole diaphragm of such precious metal was impractical not only on account of the great size of the diaphragm, but in particular on account of the fact that precious metals have poor flexure characteristics. In the case of the present invention neither a large size diaphragm nor good spring characteristics are required, and therefore, the diaphragm 14 may consist entirely of precious metal, e. g., silver.

The fluid whose pressure is to be measured never reaches the Bourdon tube 10, and, therefore, this fluid will not impair the operation of the Bourdon tube no matter how detrimental the same fluid would be to such operation if it were used within the Bourdon tube. Whether the fluid in the chamber 24 be a corrosive gas or liquid, or a liquid which on account of high viscosity would not move readily through the narrow cross section a Bourdon tube ordinarily has, or a liquid which on account of the formation of accretions would clog up rapidly such a narrow cross section, the action of the Bourdon tube will not be affected by such properties of the fluid in the chamber 24. The fluid which actually enters the Bourdon tube 10 is the "inert liquid" previously mentioned and not the fluid filling the chamber 24 underneath the diaphragm 14. Assuming, for instance, that this fluid be a varnish or a lacquer, such liquid will form, it is true, a deposit on the lower side of the diaphragm 14. It will be obvious, however, that this deposit may be easily wiped off from the diaphragm 14 after the Bourdon tube unit shown in Fig. 3 has been removed from the container 22 by unscrewing the nut 39. The diaphragm consisting as a whole of precious metal, no corrosion or other chemical impairment of the diaphragm will take place.

As shown in Fig. 1, the diameter of the chamber 24 is smaller than the outer diameter of the diaphragm 14, and, therefore, only the central part of the diaphragm is exposed to the corroding, congealing or otherwise not harmless fluid, whereas the edge of the diaphragm soldered to the rim 16 of the base 12 and the clamping means are not exposed to that fluid. As has been mentioned before, this arrangement also assures that during operation the edge portion of the diaphragm is forcibly held on its seat on the rim 16 independently of the soldering.

To keep the instrument in good order, it is only necessary to remove from time to time the Bourdon tube assembly from the container 22, so as to expose the lower side of the diaphragm 14 and wipe clean the perfectly unobstructed center portion thereof. It is only when the Bourdon tube assembly is so removed from the container 22 that the soldering between the diaphragm and its seat is called upon to take up the weight of the liquid in the pressure chamber 15 and the Bourdon tube.

While a preferred form of the invention has been herein shown and described, I desire it to be understood that various changes may be made in the details of the construction shown without departing from the spirit of this invention or the scope of the appended claims.

What I claim is:

1. A device which can be cleaned for protecting a pressure gauge against harmful fluids, comprising in combination, a gauge containing a pressure-responsive device, a cup-shaped base for said gauge having a central passage leading to the pressure-responsive device, conically tapered side walls on the inside of said cup-shaped base and an annular surface in the bottom of the cup-shaped base adjacent to its side walls; a circular metal diaphragm adapted to be fused to said base along said annular surface to close off the inlet through the base, an inert liquid filling the pressure-responsive device and said passage and the space between the diaphragm and the bottom of the cup-shaped base, a cup-shaped cylindrical stamping adapted to pass into the cup-shaped base and to crowd the diaphragm against said annular surface, an annular wedge-shaped piece fitting into the space between the cylindrical outside portion of the said stamping and the inside of the conically tapered side walls of said cup-shaped base, means mounted on said gauge and engaging said annular piece for drawing the said wedge-shaped annular piece more tightly into said space after assembly of the parts, a passage extending through the bottom of said cup-shaped cylindrical stamping for transmitting the fluid whose pressure is to be measured to said diaphragm.

2. A device which can be cleaned for protecting a pressure gauge against harmful fluids, comprising in combination, a gauge containing a pressure-responsive device, a cup-shaped base for said gauge having a central passage leading to the pressure-responsive device, conically tapered side walls on the inside of said cup-shaped base and an annular surface in the bottom of the cup-shaped base adjacent to its side walls; a circular metal diaphragm adapted to be fused to said base along said annular surface closing off the inlet through the base, an inert liquid filling the pressure-responsive device and said passage and the space between the diaphragm and the bottom of the cup-shaped base, a cup-shaped cylindrical stamping of relatively soft metal adapted to pass into the cup-shaped base and to crowd the diaphragm against said annular surface, an annular wedge-shaped piece of relatively hard material fitting into the space between the cylindrical outside portion of the said stamping and the inside of the conically tapered side walls of said cup-shaped base, a sharp edge on the inside of said annular wedge-shaped piece adapted to engage the surface of said stamping, means mounted on said gauge and engaging said annular piece for drawing the said wedge-shaped annular piece more tightly into said space after assembly of the parts, a passage extending through the bottom of said cup-shaped cylindrical stamping for transmitting the fluid whose pressure is to be measured to said diaphragm.

3. A device which can be cleaned for protecting a pressure gauge against harmful fluids, comprising in combination, a gauge containing a pressure-responsive device, a cup-shaped base for said gauge having a central passage leading to the pressure-responsive device, conically tapered side walls on the inside of said cup-shaped base and an annular surface in the bottom of the cup-shaped base adjacent to its side walls; a circular metal diaphragm adapted to be fused to said base along said annular surface to close off the inlet through the base, an inert liquid filling the pressure-responsive device and said passage and the space between the diaphragm and the bottom of the cup-shaped base, a cup-shaped cylindrical stamping adapted to pass into the cup-shaped base, low annular ridges on the rim of said stamping which are adapted to penetrate into the diaphragm and anchor it radially, an annular wedge-shaped piece fitting into the space between the cylindrical outside portion of the said stamping and the inside of the conically tapered side walls of said cup-shaped base, means mounted on said gauge and engaging said annular piece for drawing the said wedge-shaped annular piece more tightly into said space after assembly of the parts thereby crowding the rim of the stamping against the diaphragm, a passage extending through the bottom of said cup-shaped cylindrical stamping for transmitting the fluid whose pressure is to be measured to said diaphragm.

AMBROSE E. LE VAN.

REFERENCES CITED

The following references are of record in the file of this patent:

UNITED STATES PATENTS

| Number | Name | Date |
|---|---|---|
| 324,251 | Hartwell | Aug. 11, 1885 |
| 1,346,941 | Crocker | July 20, 1920 |
| 1,864,906 | Hirsch | June 28, 1932 |
| 2,096,831 | Wappler | Oct. 26, 1937 |
| 2,216,374 | Martin | Oct. 1, 1940 |
| 2,244,335 | Hopkins | June 3, 1941 |
| 2,260,636 | Neff | Oct. 28, 1941 |
| 2,261,027 | Hopkins | Oct. 28, 1941 |